US011630025B2

(12) United States Patent
McDaniel et al.

(10) Patent No.: US 11,630,025 B2
(45) Date of Patent: Apr. 18, 2023

(54) ROBOTIC INSPECTION DEVICE

(71) Applicants: Dwayne E. McDaniel, Miramar, FL (US); Mackenson Telusma, Miami, FL (US); Leonel E. Lagos, Miami, FL (US)

(72) Inventors: Dwayne E. McDaniel, Miramar, FL (US); Mackenson Telusma, Miami, FL (US); Leonel E. Lagos, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 134 days.

(21) Appl. No.: 17/221,192

(22) Filed: Apr. 2, 2021

(65) Prior Publication Data

US 2021/0310895 A1    Oct. 7, 2021

Related U.S. Application Data

(60) Provisional application No. 63/004,279, filed on Apr. 2, 2020.

(51) Int. Cl.
*G01M 5/00* (2006.01)
*B25J 9/00* (2006.01)
*B60B 19/00* (2006.01)
*B25J 5/00* (2006.01)
*B25J 13/00* (2006.01)

(52) U.S. Cl.
CPC .......... *G01M 5/0025* (2013.01); *B25J 5/007* (2013.01); *B25J 9/0009* (2013.01); *B25J 13/006* (2013.01); *B60B 19/003* (2013.01)

(58) Field of Classification Search
None
See application file for complete search history.

(56) References Cited

U.S. PATENT DOCUMENTS

| | | | |
|---|---|---|---|
| 8,738,226 B2* | 5/2014 | Troy | B64F 5/30 701/1 |
| 10,532,781 B2* | 1/2020 | Xiao | A47L 1/02 |
| 2011/0125462 A1* | 5/2011 | Petrosky | G01N 29/265 901/46 |
| 2011/0196534 A1* | 8/2011 | Ekes | F16L 55/48 901/44 |
| 2014/0216836 A1* | 8/2014 | Davies | B62D 55/265 180/164 |
| 2014/0361077 A1* | 12/2014 | Davidson | G06Q 10/087 235/385 |
| 2019/0023334 A1* | 1/2019 | Akin | B62D 55/116 |
| 2020/0264333 A1* | 8/2020 | Wittaker | G01T 7/00 |

OTHER PUBLICATIONS

Stefan Vages. Inspection of Multi-diameter Pipelines Operating at Low Pressure, (Year: 2018).*

* cited by examiner

*Primary Examiner* — Raul J Rios Russo
*Assistant Examiner* — Carl F. R. Tchatchouang
(74) *Attorney, Agent, or Firm* — Saliwanchik, Lloyd & Eisenschenk

(57) ABSTRACT

Robotic devices that can be utilized on pipes of any material and of a variety of pipe diameters are provided. The robotic device utilizes a ducted fan to create the normal forces needed to adhere to any part of a pipe. The chassis of the device can be segmented to allow for application on various diameter pipes.

17 Claims, 21 Drawing Sheets

FIG. 17
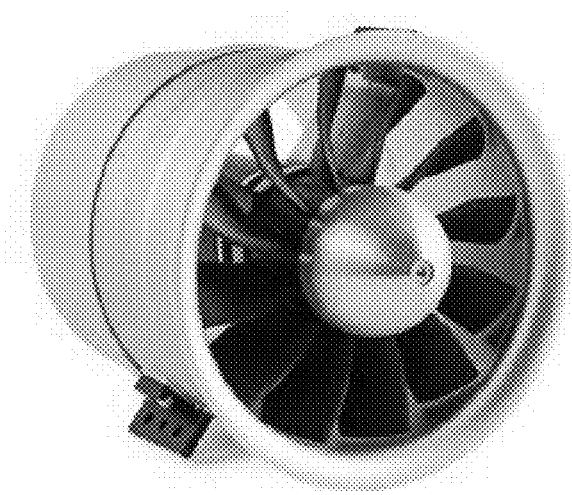 
FIG. 18A  FIG. 18B

D

ROBOTIC INSPECTION DEVICE

CROSS-REFERENCE TO RELATED APPLICATION

This application claims the benefit of U.S. Provisional Application Ser. No. 63/004,279, filed Apr. 2, 2020, which is hereby incorporated by reference herein in its entirety, including any figures, tables, and drawings.

GOVERNMENT SUPPORT

This invention was made with government support under DE-FE0031651 awarded by Department of Energy. The government has certain rights in the invention.

BACKGROUND

Transfer systems with large diameter pipes require maintenance and inspection periodically. The pipes can be manufactured with magnetic material (carbon steel) but can also be manufactured with stainless steel or other non-metallic materials. In some cases, the pipes are covered with insulation and can't be inspected with conventional magnetic robots.

BRIEF SUMMARY

There exists a need in the art for a robotic inspection tool that can be used on pipes manufactured with non-magnetic materials. Embodiments of the subject invention provide robotic devices, and methods of using the same, that can be utilized on pipes of any material and of a variety of pipe diameters. The robotic device can in some cases be designed to operate on a specific range of pipe diameters. The device utilizes a ducted fan to create the normal forces needed to adhere to any part of the pipe. The chassis of the device can be segmented to allow for application on various diameter pipes.

In an embodiment, a robotic inspection device can comprise: a body chassis; a plurality of wheels (e.g., four wheels) attached to the body chassis and disposed lower than a lower surface of the body chassis, in a first direction perpendicular to the lower surface of the body chassis; and at least one electronic ducted fan (EDF) disposed on the body chassis and configured to blow air in a second direction opposite to the first direction, thereby providing thrust in the first direction to the robotic inspection device. The body chassis can be curved such that the robotic inspection device is configured to navigate on an external surface of a pipe (e.g., a pipe having a diameter in a range of from 13 inches to 16 inches or having a diameter of at least 32 inches (e.g., 36 inches) or having a diameter of at least 13 inches). Each wheel of the plurality of wheels can be a two-degree-of-freedom (2-DOF) wheel. The at least one EDF can comprise a first EDF disposed in a center area of the body chassis and/or at least one of a second EDF, a third EDF, a fourth EDF, and a fifth EDF respectively disposed at four corner areas of the body chassis. The body chassis can be segmented or can be a single, monolithic structure. The device can further comprise at least one nondestructive examination (NDE) sensor disposed on the body chassis. The robotic inspection device can further comprise an omnidirectional drive mechanism disposed on each wheel of the plurality of wheels. The omnidirectional drive mechanism can comprise a planetary gear drive setup, an absolute encoder rod mount, and/or a design for large force distribution along a bottom motor enclosure unit. The wheels of the plurality of wheels can be disposed at the respective corner areas of the body chassis. The robotic inspection device can further comprise a radio receiver and transmitter configured to remotely communicate with a controller for controlling at least one of a speed of the at least one EDF, an orientation of the plurality of wheels, and a speed of the plurality of wheels.

In another embodiment, a method of inspecting a pipe or wall can comprise: providing a robotic inspection device on the pipe or wall, the robotic inspection device comprising a body chassis, a plurality of wheels attached to the body chassis and disposed lower than a lower surface of the body chassis, in a first direction perpendicular to the lower surface of the body chassis, at least one EDF disposed on the body chassis and configured to blow air in a second direction opposite to the first direction, thereby providing thrust in the first direction to the robotic inspection device, and a receiver for receiving control signals from a controller; and controlling, using the controller, at least one of a speed of the at least one EDF, an orientation of the plurality of wheels, and a speed of the plurality of wheels such that the robotic inspection device navigates on the pipe or wall. The body chassis can be curved such that the robotic inspection device is configured to navigate on an external surface of the pipe (e.g., a pipe having a diameter in a range of from 13 inches to 16 inches or having a diameter of at least 32 inches (e.g., 36 inches) or having a diameter of at least 13 inches). Each wheel of the plurality of wheels can be a 2-DOF wheel. The at least one EDF can comprise a first EDF disposed in a center area of the body chassis and/or at least one of a second EDF, a third EDF, a fourth EDF, and a fifth EDF respectively disposed at four corner areas of the body chassis. The robotic inspection device can further comprise at least one NDE sensor disposed on the body chassis, and the method can further comprise receiving data from the at least one NDE sensor. The robotic inspection device can further comprise an omnidirectional drive mechanism disposed on each wheel of the plurality of wheels. The omnidirectional drive mechanism can comprise a planetary gear drive setup, an absolute encoder rod mount, and/or a design for large force distribution along a bottom motor enclosure unit. The receiver can be a radio receiver that remotely receives control signals from the controller, and/or the robotic inspection device can further comprise a radio transmitter configured to remotely transmit signals to the controller.

In an embodiment, a robotic inspection device can comprise: a body chassis; a plurality of wheels attached to the body chassis and disposed lower than a lower surface of the body chassis, in a first direction perpendicular to the lower surface of the body chassis, the plurality of wheels comprising four wheels respectively disposed at corner areas of the body chassis; at least one EDF disposed on the body chassis and configured to blow air in a second direction opposite to the first direction, thereby providing thrust in the first direction to the robotic inspection device; at least one NDE sensor disposed on the body chassis; an omnidirectional drive mechanism disposed on each wheel of the plurality of wheels; and a radio receiver and transmitter for remotely communicating with a controller for controlling at least one of a speed of the at least one EDF, an orientation of the plurality of wheels, and a speed of the plurality of wheels. The body chassis can be curved such that the robotic inspection device is configured to navigate on an external surface of a pipe (e.g., a pipe having a diameter in a range of from 13 inches to 16 inches or having a diameter of at least 32 inches (e.g., 36 inches) or having a diameter of at least 13 inches). Each wheel of the plurality of wheels can be a 2-DOF wheel. The at least one EDF can comprise a first EDF disposed in a center area of the body chassis and/or at least one of a second EDF, a third EDF, a fourth EDF, and a fifth EDF respectively disposed at four corners of the body chassis. The omnidirectional drive mechanism can comprise a planetary gear drive setup, an absolute encoder rod mount, and/or a design for large force distribution along a bottom motor enclosure unit.

BRIEF DESCRIPTION OF DRAWINGS

FIG. 17 is an image showing the robotic device of FIGS. 14B, 15, and 16 in use, upside down on a horizontal surface.

FIG. 18A is an image showing a perspective (blade) view of an electronic ducted fan (EDF) that can be used with a robotic device according to an embodiment of the subject invention.

FIG. 18B is an image showing a side view of the EDF of FIG. 18A.

DETAILED DESCRIPTION

Embodiments of the subject invention provide robotic devices, and methods of using the same, that can be utilized on pipes of any material and of a variety of pipe diameters. The robotic device can in some cases be designed to operate on a specific range of pipe diameters. The device utilizes a ducted fan to create the normal forces needed to adhere to any part of the pipe. The chassis of the device can be segmented to allow for application on various diameter pipes.

Related art devices to obtain structural health information on piping made from non-metallic material is limited. Systems can utilize grippers that apply force on the pipe and likely reach around a large portion of the circumference of the pipe to create forces necessary to stay attached. In these systems, the system typically traverses the pipe slowly. Other systems do not adhere to the pipe at all and utilize drones housing sensors to fly close to the pipe and deploy the sensors. Embodiments of the subject invention utilize a ducted fan to apply adhesion force and can traverse quickly along the outside of a pipe. Such a robotic inspection tool can navigate on the outside of various size pipes manufactured with non-magnetic material. Such a device can even be used on pipes with a diameter of 12-16 inches.

Figure 1:
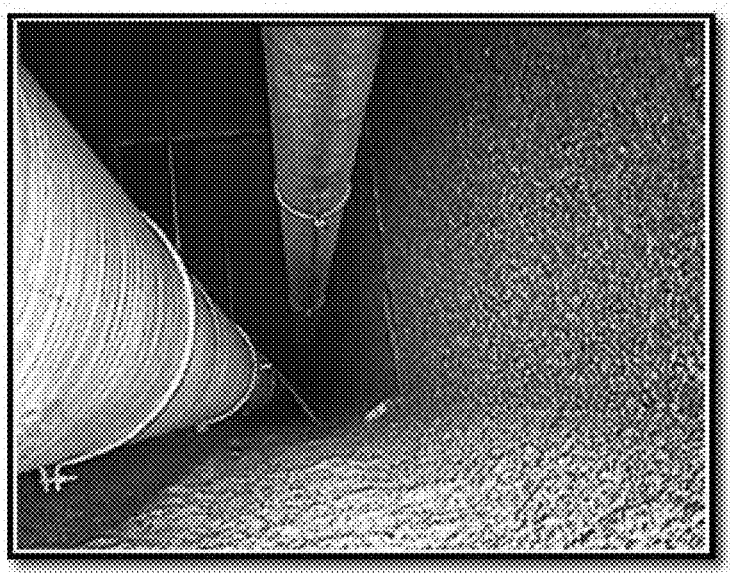
FIG. 1 is an image of a tunnel with pipes, taken at the Savannah River National Laboratory (SRNL), located in Aiken, S.C.

The Savannah River National Laboratory (SRNL), located in South Carolina, is a fully functional nuclear material management facility that plays a crucial role in the Department of Energy Environmental Management mission for the processing and storage of radioactive waste material. SRNL is also home to H-Canyon, which is the only operating production-scale, radiologically shielded, chemical separations facility in the United States. The separation process for radioactive material creates by-products, including nitric acid, which is passed through an exhaust tunnel at H-Canyon, and FIG. 1 shows an image of such an exhaust tunnel. The nitric acid is very corrosive and has been one of the primary stressors degrading the walls of the canyon since 1950. Embodiments of the subject invention can aid in the process of gathering necessary visual information and data to understand the degradation of the entire exhaust tunnel (as well as other tunnels and pipes like it). Previous efforts to inspect the tunnel with robotic systems have failed, and little information was obtained about the portion of the walls hidden behind the 3-foot diameter aluminum duct shown in FIG. 1. Embodiments of the subject invention can work in tandem with a robotic platform and manipulator arm. A robotic platform may be capable of getting visual information and LiDAR data of a majority of the tunnel, but would require an additional tool to obtain data behind the duct. Although the tunnel has a cross section of approximately 10 feet×10 feet, the robotic platform and manipulator arm are limited in their extension due to the exhaust flow, which can be between 30 miles per hour (mph) and 100 mph. Thus, a small, tethered, mobile platform that can navigate around the top or bottom of a duct and gather information has many advantages; embodiments of the subject invention provide such platforms.

In an embodiment, a robotic device 100 can include a chassis 110 with powered wheels 120 (e.g., four powered wheels) and a ducted fan 130. Because the duct at SRNL is aluminum, magnets cannot be used to adhere to the pipe, which is a common approach in many related art robotic tools. In the embodiment, the robotic device is able to maintain contact even when maneuvering to an orientation that would normally have the unit fall, due to a combination of suction and thrust from the ducted fan. The air enters the bottom of the chassis at a speed lower than the exiting speed at the top of the flow structure atop the chassis center. This creates a negative pressure differential zone between the inside of the chassis bottom and the ambient environment, which generates the suction effect. This, in combination with the thrust created by the ducted fan, produces the normal force required to generate traction for the wheels to drive the system. The wheels 120 can be disposed lower than a lower surface of the body chassis 110, in a first direction 210 perpendicular to the lower surface of the body chassis 110, and the ducted fan 130 can be configured to blow air in a second direction 220 opposite to the first direction 210, thereby providing thrust in the first direction 210 to the robotic inspection device 100.

The device can navigate on non-magnetic pipes, including on elbows and tees. The device can deploy a nondestructive examination (NDE) sensor for inspection (e.g., in areas where moisture accumulates). The device can navigate on any portion of pipes (e.g., top, bottom, or side), including operating upside down. The device can operate longitudinally and/or radially and can overcome small anomalies in a pipe being inspected. The device can be controlled (e.g., fan speed, wheel orientation, wheel speed) manually (e.g., via radio transmission) or automatically. Power can be supplied in a wired manner or with an onboard power supply.

Figure 2A:
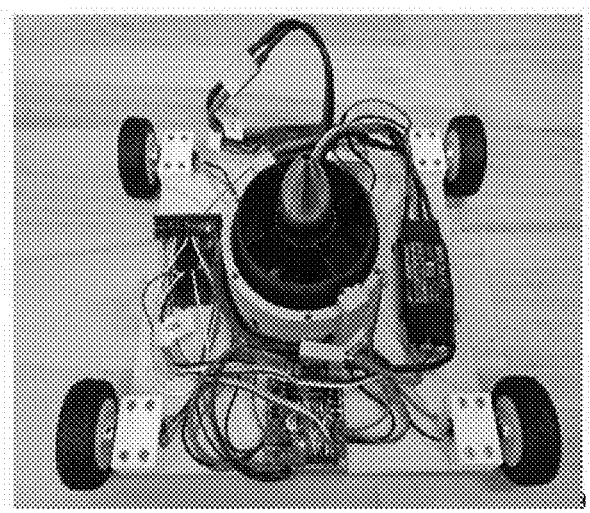
FIG. 2A is an image of a top view of a robotic device according to an embodiment of the subject invention.
Figure 2B:
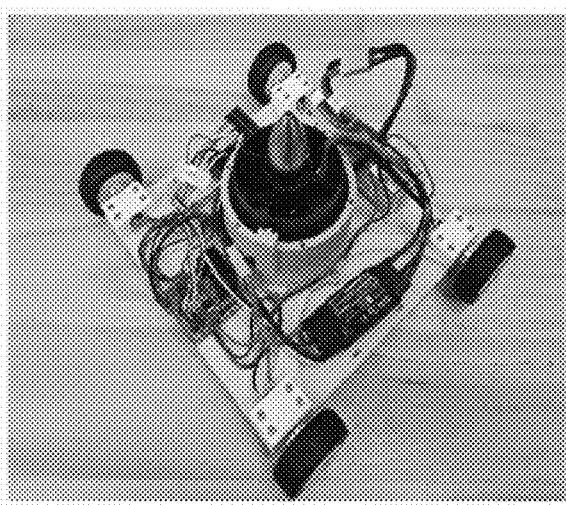
FIG. 2B is an image of a perspective view of the device in FIG. 2A.
Figure 2C:
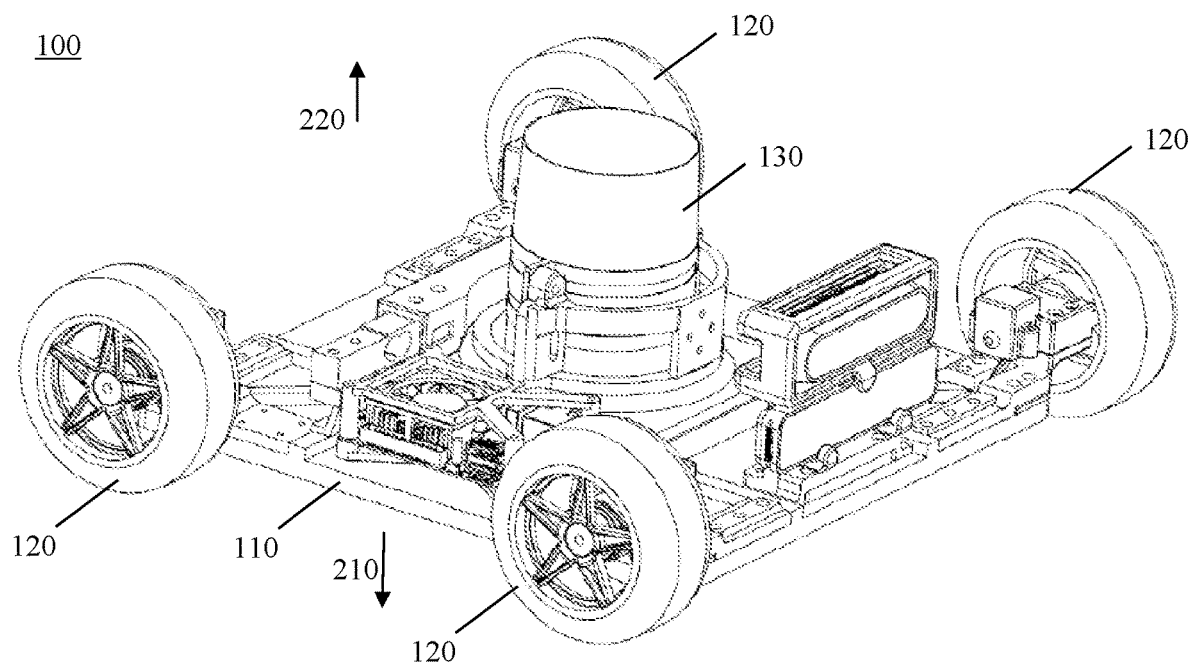
FIG. 2C is a schematic view of a robotic device according to an embodiment of the subject invention, similar to that shown in FIGS. 2A and 2B.
Figure 3A:
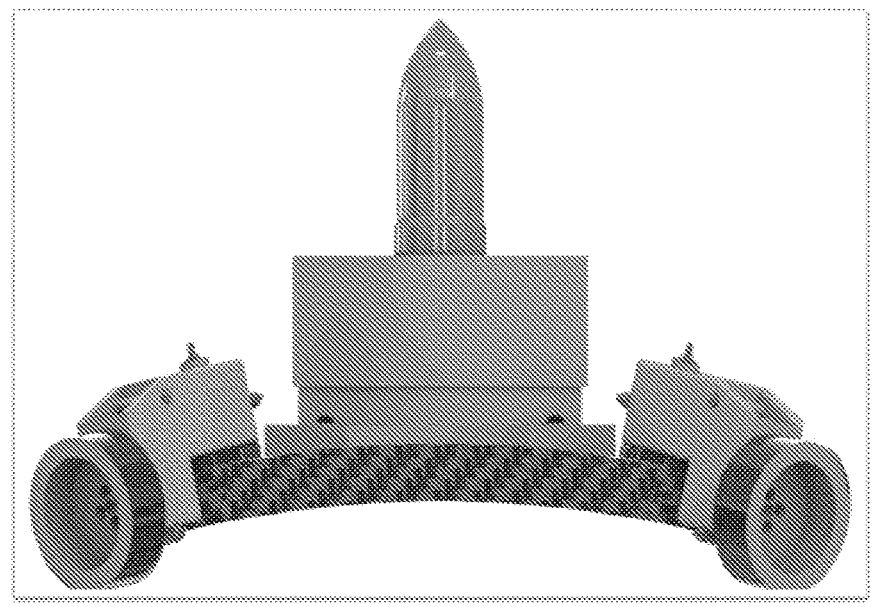
FIG. 3A is a side view of a robotic device according to an embodiment of the subject invention.
Figure 3B:
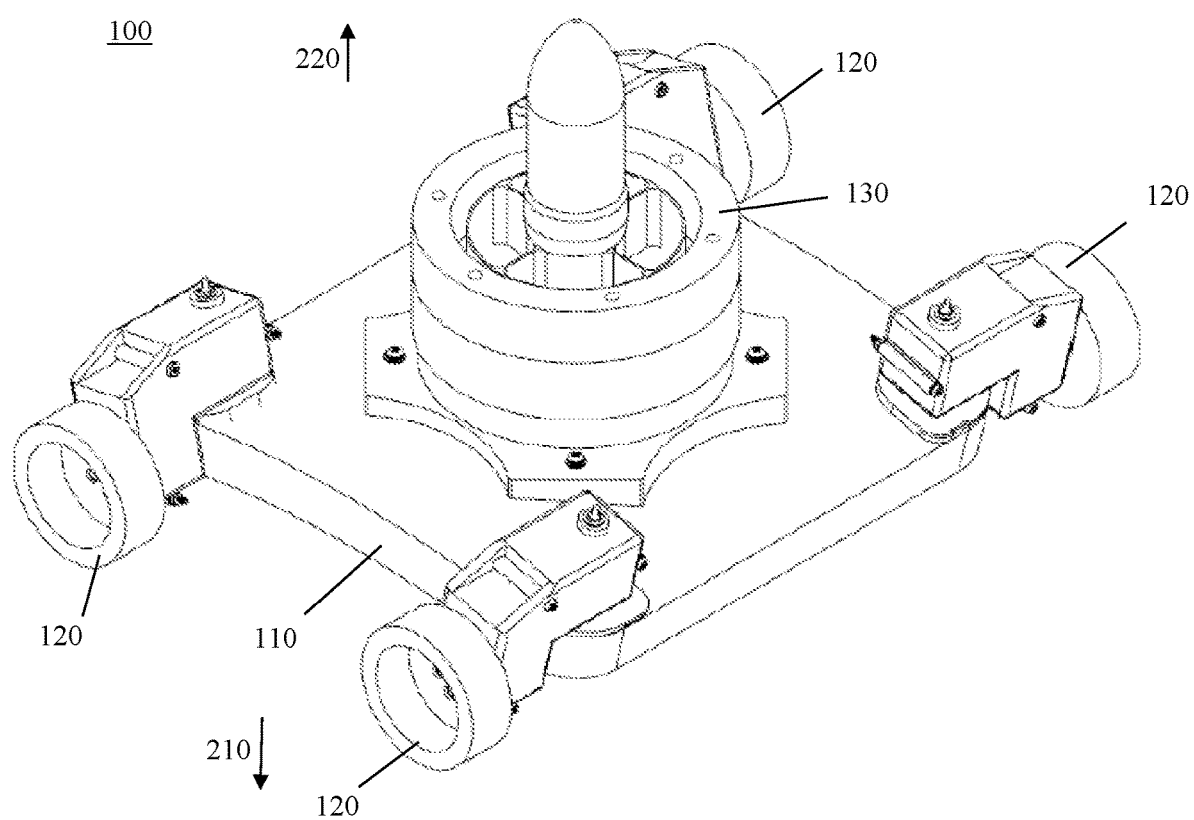
FIG. 3B is a schematic view of a robotic device according to an embodiment of the subject invention, similar to that shown in FIG. 3A.
Figure 4:
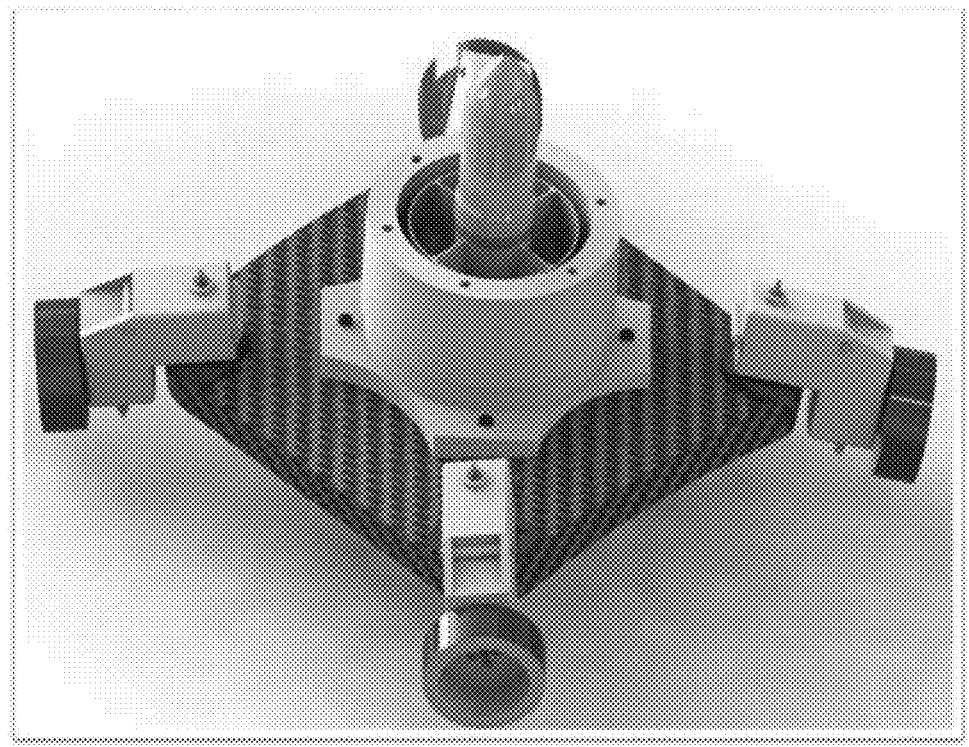
FIG. 4 is a perspective view of the device in FIG. 3A.

FIGS. 2A-2C show images and a schematic view of a device that can navigate up and down flat walls. This device shows that the fan can create a significant enough normal force to allow the motors to drive the system and not have the unit fall off of the wall. With its wheels being designed for a flat wall, it is not useful for pipes.

In many embodiments, the chassis is curved to match the curvature of the outside of a duct/pipe. FIGS. 3A, 3B, and 4-10 show images and schematic views of such devices, and FIGS. 7-9 in particular show the device on the outside of a pipe. The device utilizes four independently powered wheels and a ducted fan, but mounted on a curved chassis that matches the curvature of a duct/pipe. The curved chassis can be made using, for example, a high strength-to-weight ratio composite and allows the unit to navigate around the circumference of the duct/pipe or down the axis of the duct/pipe. This type of navigation requires that the wheels have an articulating 2 degree-of-freedom (DOF) mount 121. The chassis is also large enough to include a camera or other image sensor (e.g., a high definition camera) to record or stream visual data, as well as any other sensors that might be desired for analysis of a pipe.

Figure 5:
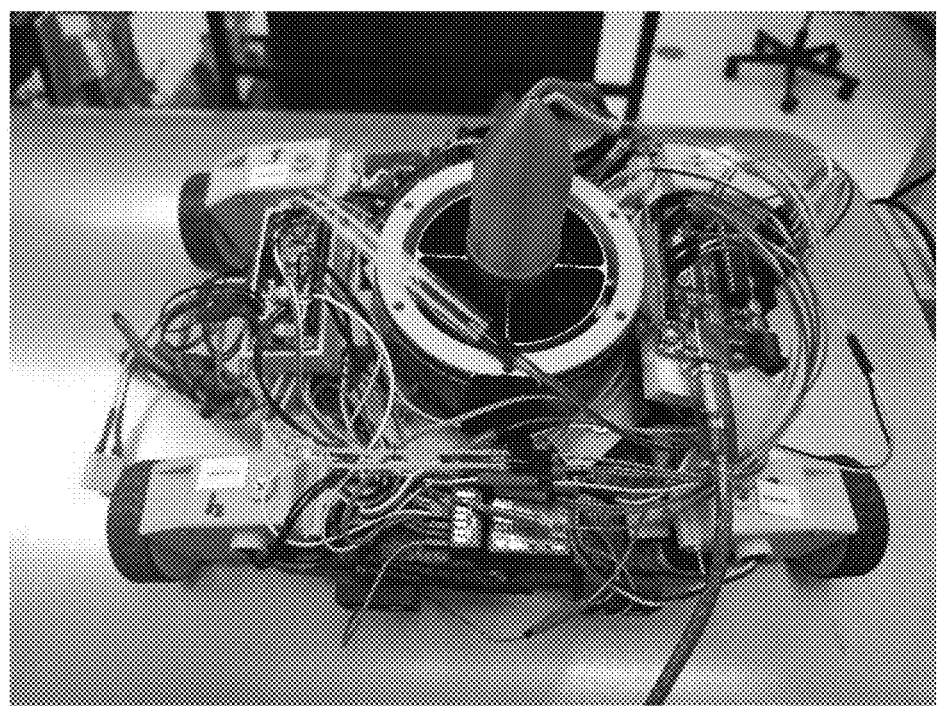
FIG. 5 is an image of a perspective view of a robotic device according to an embodiment of the subject invention.
Figure 6:
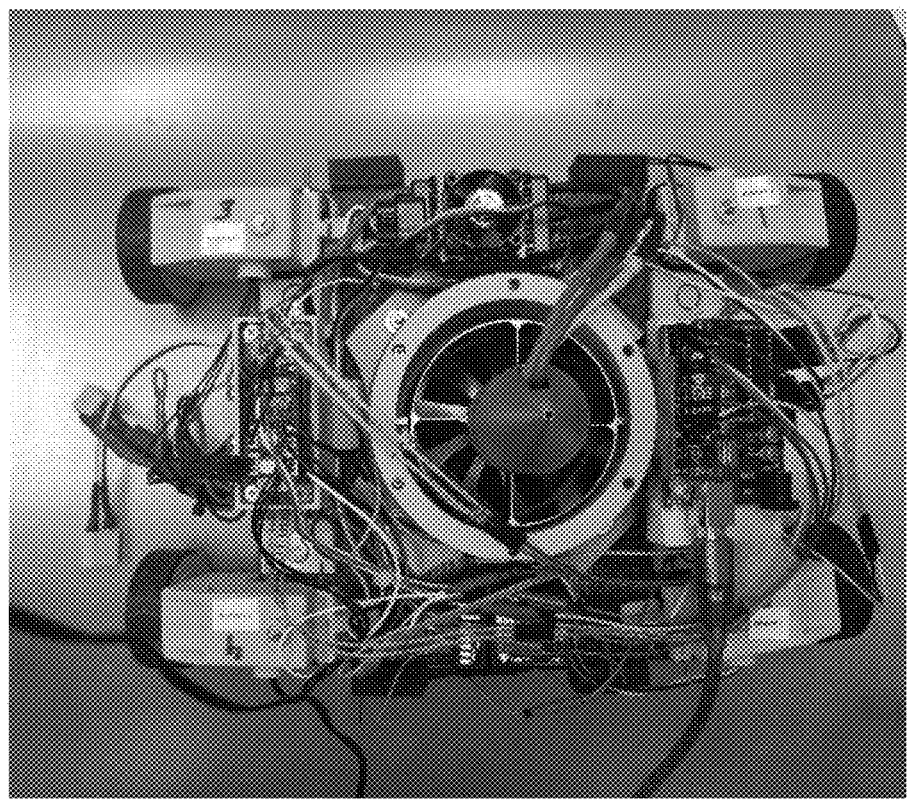
FIG. 6 is an image of a top view of the device in FIG. 5.
Figure 10:
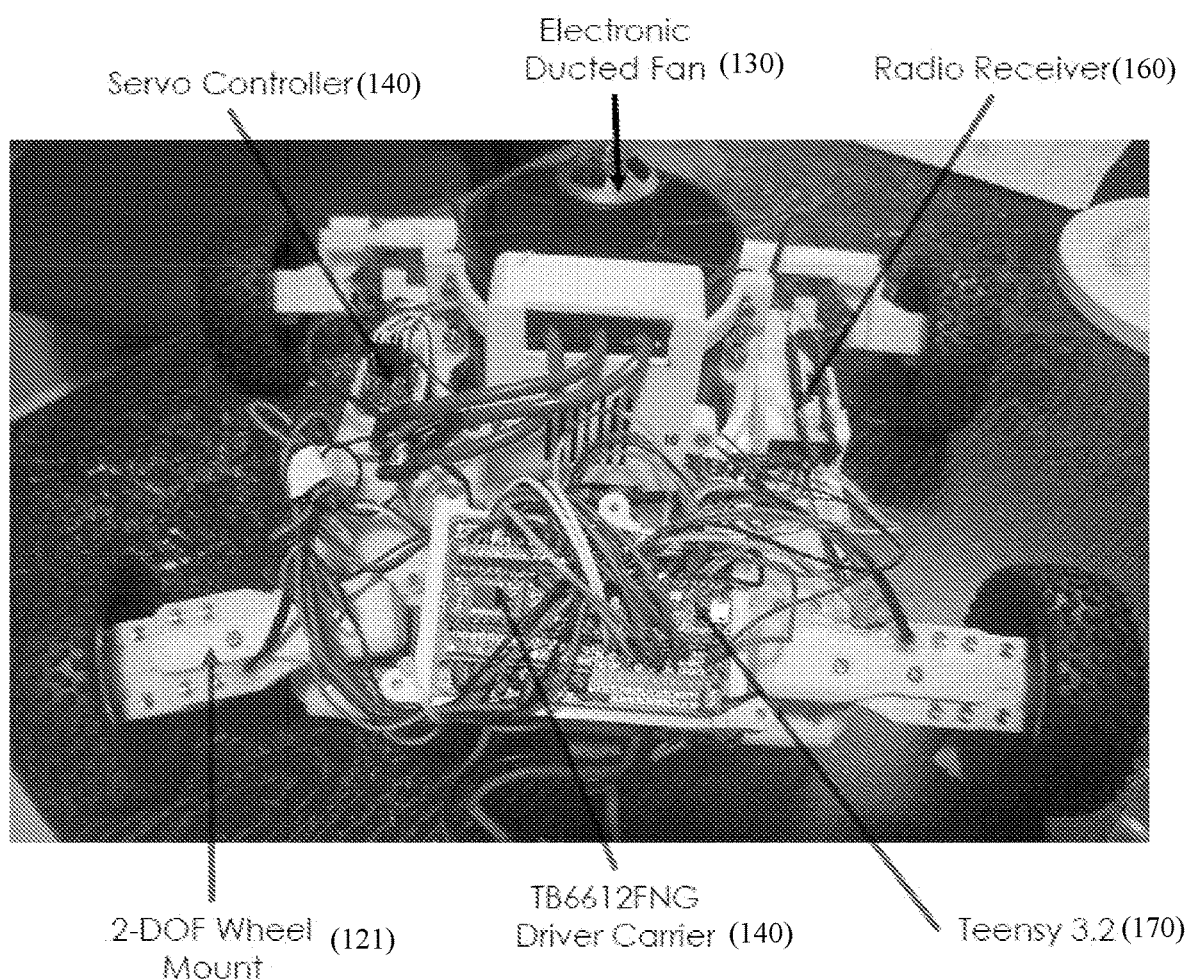
FIG. 10 is an image of a perspective view of a robotic device according to an embodiment of the subject invention.

Referring to FIGS. 5, 6, and 10 the device can include an electronic ducted fan (EDF) 130 and four 2-DOF wheel mounts 121 for radial and lateral movement. The normal force is generated by the EDF (e.g., a 70-millimeter EDF) and can be used to support the weight of the device and still provide enough force to aid in generating the traction force for navigation when the device is upside down. Referring to FIG. 10 in particular, the device can include an inertial measurement unit (IMU) for orientation determination, a radio receiver 160 (and remote transmitter, for controlling fan speed, wheel orientation, and wheel speed), motor controllers 140 (e.g., Micro Maestro USB Servo controller (for wheel orientation) and TB6612FNG Dual Motor Driver Carrier (for wheel speed)), a microcontroller unit 170 (e.g., a Teensy 3.2 microcontroller unit) for communication to controllers, and/or one or more step down voltage regulators (e.g., input of 22 V and output of 12 V and/or 6V).

The level of thrust generated by the EDF can be controlled manually (e.g., via an RC controller) or automatically/semi-autonomously (e.g., using an Arduino based microcontroller) with a controller to process the sensor data coming from force sensitive resistors (FSRs) and an IMU of the device. The FSRs can be located, for example, between the wheel mounts and chassis and can be used as part of a closed feedback control system to semi-autonomously control the thrust needed to maintain contact with the surface. A proportional-integral-derivative control algorithm can be used to ensure the minimum normal force is used at the corresponding pitch angles. That is, as the device begins to slip on the surface (e.g., navigates under the pipe), the thrust can be increased to ensure proper traction is maintained.

The chassis can be sized according to the diameter (or diameter range) pipe it is intended to be used on. The chassis can be made out of any suitable material (e.g., a composite such as a carbon/epoxy composite), and its curvature can be designed to match the curvature of the pipe it is inspecting. The controls, EDF, wheels, motor(s), and any other elements can be the same for the device regardless of the size pipe it is designed to inspect. Various types of instrumentation can also be included on the device. For example, the device can include one or more cameras or other image sensors, one or more ultrasonic sensors, and/or other types of NDE tools. A power supply can be included (e.g., mounted) on the chassis of the device. An onboard power supply can be used for the motor(s), EDF, camera, and/or any additional sensors or NDE tools. A robot operating system (ROS) can be used for integration of an IMU, wheel encoders, and/or stereo tracking camera on the device. Localization can be coordinated with a 3D camera, LiDAR, and/or a user NDE sensor.

Figure 11A:
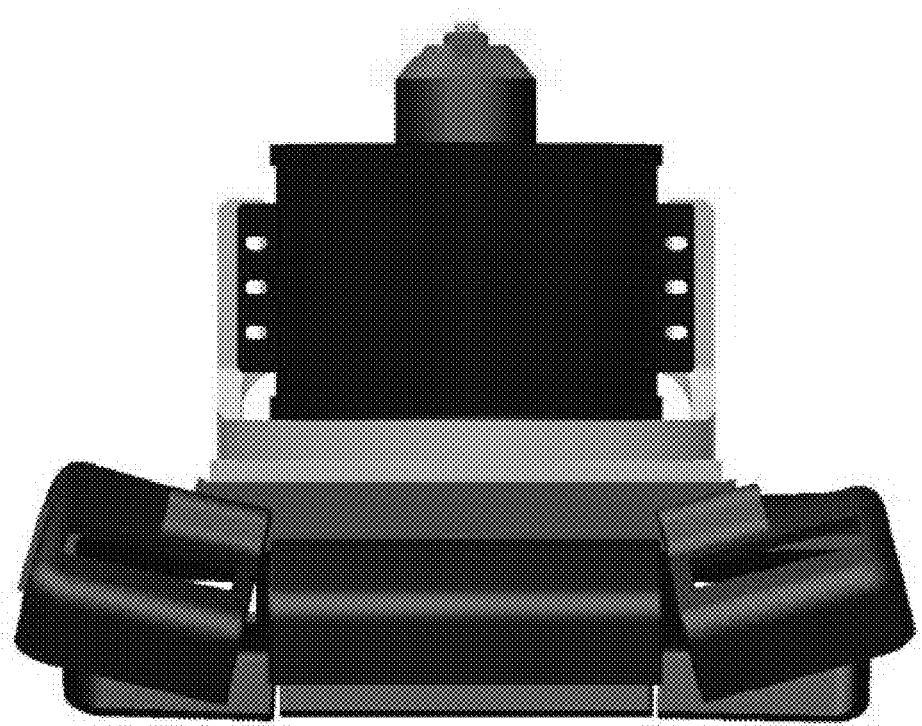
FIG. 11A is an image of a side view of a robotic device according to an embodiment of the subject invention.
Figure 11B:
FIG. 11B is an image of a perspective view of a robotic device according to an embodiment of the subject invention.

In an embodiment, the chassis can include one or more hinges to increase maneuverability over surfaces of different diameters. The hinge movement/positioning can be controlled by one or more small torque motors (e.g., one for each hinge) on the device. Hinges can allow the device to traverse over larger anomalies on a pipe surface (e.g., flanges and/or bolts). FIGS. 11A and 11B show a device with hinges.

Embodiments of the subject invention provide innovative robotic crawler devices to navigate on surfaces (e.g., non-metallic surfaces) using a thrust mechanism as a means of adhesion to the surfaces. The devices can travel on smooth or rugged surfaces and transition from the floor to vertical walls and to ceilings. The device can carry payloads and/or sensors that can be used to collect information regarding the health of the structure or conduct repairs of the structure having the surface on which the device is navigating. In addition to traveling on flat surfaces, the devices can be used to navigate on the outside of large (e.g., 36-inch diameter or even larger) and small (e.g., 13.5-inch diameter or even smaller) pipes (or any size in between) by manufacturing a chassis that matches the curvature of the pipe. A fan can be used to create a normal force to develop traction required for movement. Multiple fans can be added to increase the carrying capacity of the device.

The adhesion approach of devices of embodiments of the subject invention can be used for several different environments/surfaces. For example, a device can navigate on the external surface of a large (e.g., 36-inch diameter) pipe (e.g., a non-metallic pipe, such as an aluminum pipe). Such a device can be seen in FIGS. 12A and 12B. As another example, a device can navigate on the external surface of a small (e.g., 13.5-inch diameter) pipe (e.g., a non-metallic pipe, such as a pipe with an outer aluminum covering, insulation, and/or an inner carbon steel material (as is often used in the petroleum industry). Such a device can be seen in FIGS. 10, 13A, and 13B. As another example, a device can navigate on a wall (e.g., a rugged wall, such as an eroded and/or corroded concrete wall). Such a device can be seen in FIGS. 14A, 14B, 15-17, and 19-22B. A large EDF can be used, such as that depicted in FIGS. 18A and 18B (e.g., a 90-mm EDF unit). In some embodiments, multiple fans 130 can be used, such as five fans 131, 132, 133, 134, 135 (e.g., near the center of the chassis and at four corners of the chassis corresponding to wheel positions, as depicted in FIGS. 19-22B).

Figure 23A:
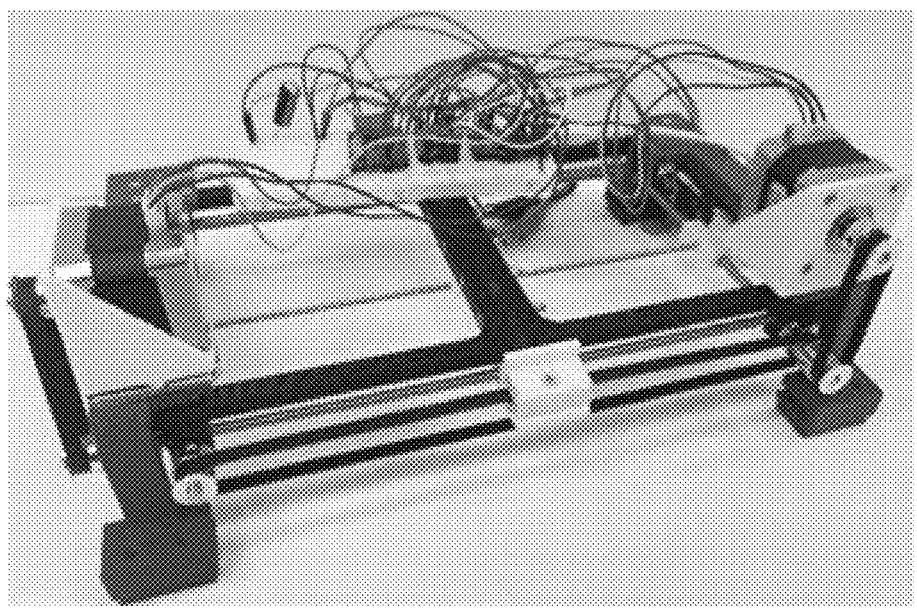
FIG. 23A is an image of an XY spray mechanism that can be used with a robotic device, according to an embodiment of the subject invention. The spray mechanism can be used to, for example, apply protective coatings on a wall or pipe (e.g., a concrete wall, such as an eroded and/or corroded concrete wall).
Figure 23B:
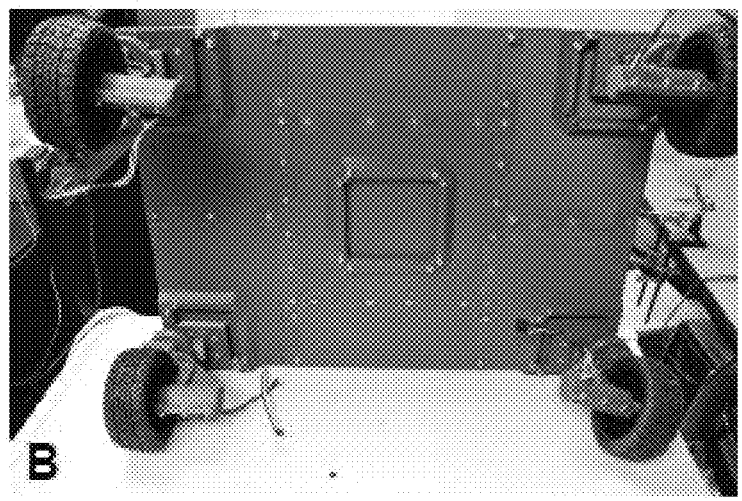
FIG. 23B is an image of an underside of a chassis of a robotic device according to an embodiment of the subject invention. A spray mechanism, such as that in FIG. 23A or FIG. 23C could be attached to the underside of the chassis.
Figure 23C:
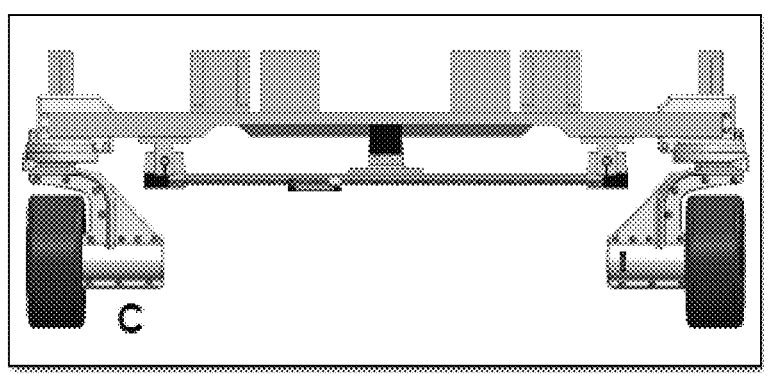
FIG. 23C is a side view of a spray mechanism can be used with a robotic device, according to an embodiment of the subject invention. The spray mechanism can be used to, for example, apply protective coatings on a wall or pipe (e.g., a concrete wall, such as an eroded and/or corroded concrete wall).
Figure 23D:
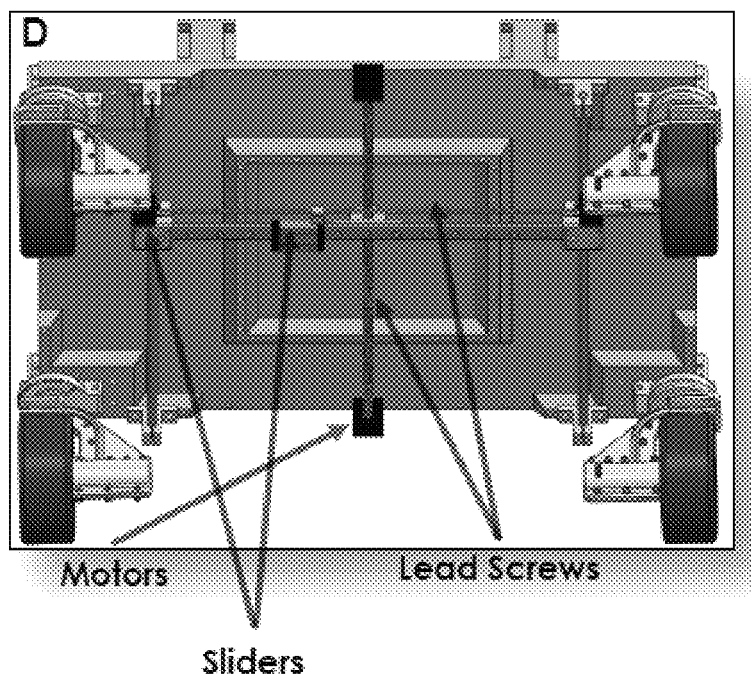
FIG. 23D is a bottom view of an underside of a chassis of a robotic device, with a spray mechanism attached thereto.
Figures 24A, 24B, 24C:
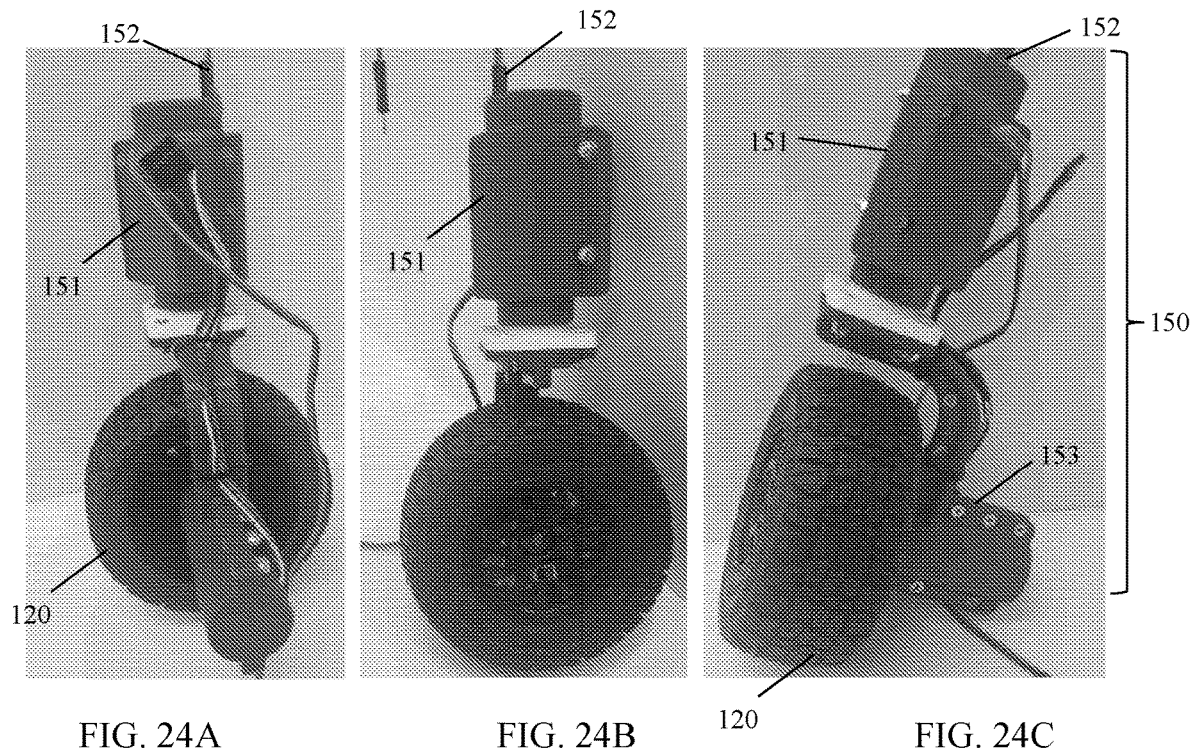
FIG. 24A is an image of an omnidirectional drive mechanism that can be used on a wheel of a robotic device, according to an embodiment of the subject invention.
FIG. 24B is an image of an omnidirectional drive mechanism that can be used on a wheel of a robotic device, according to an embodiment of the subject invention.
FIG. 24C is an image of an omnidirectional drive mechanism that can be used on a wheel of a robotic device, according to an embodiment of the subject invention.
Figure 24D:
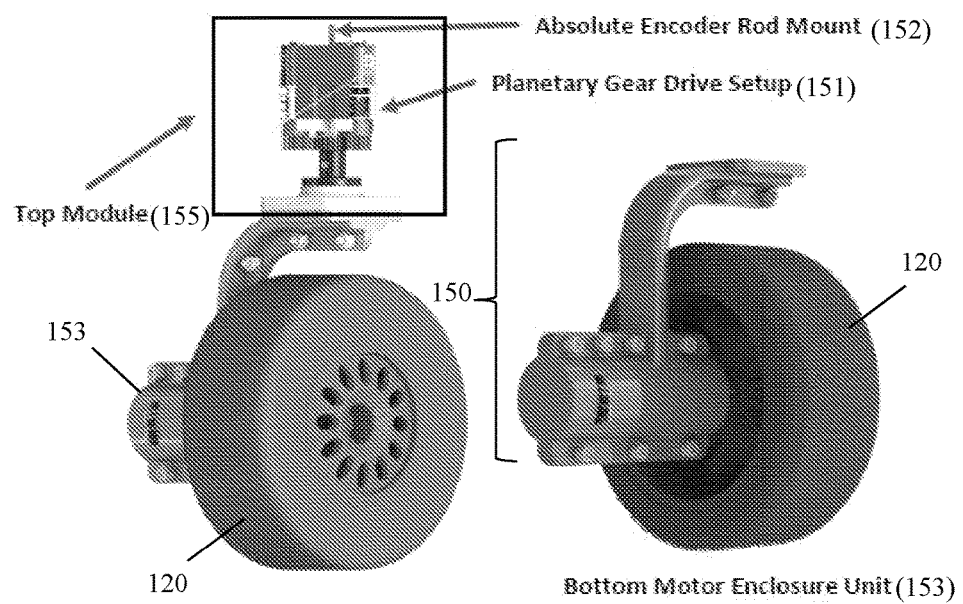
FIG. 24D is schematic view of an omnidirectional drive mechanism that can be used on a wheel of a robotic device, according to an embodiment of the subject invention. The drive mechanism can include a planetary gear drive setup (for high torque output), an absolute encoder rod mount (for robust control), and/or a design for large force distribution along a bottom motor enclosure unit.

In some embodiments, the payload of the device can include a spray mechanism (e.g., an XY spray mechanism as seen in FIGS. 23A and/or 23C). The spray mechanism can be attached to, for example, the underside of the chassis of the robotic device, though embodiments are not limited thereto. FIG. 23B shows an underside of a chassis, where a spray mechanism could be attached. The spray mechanism can be used to, for example, apply protective coatings on a wall or pipe (e.g., a concrete wall, such as an eroded and/or corroded concrete wall) while the device navigates the wall or pipe. FIG. 23D shows a spray mechanism attached to the underside of a chassis of a robotic device. Sliders and/or other fasteners (e.g., screws such as lead screws) can be used for attachment.

Figure 22A:
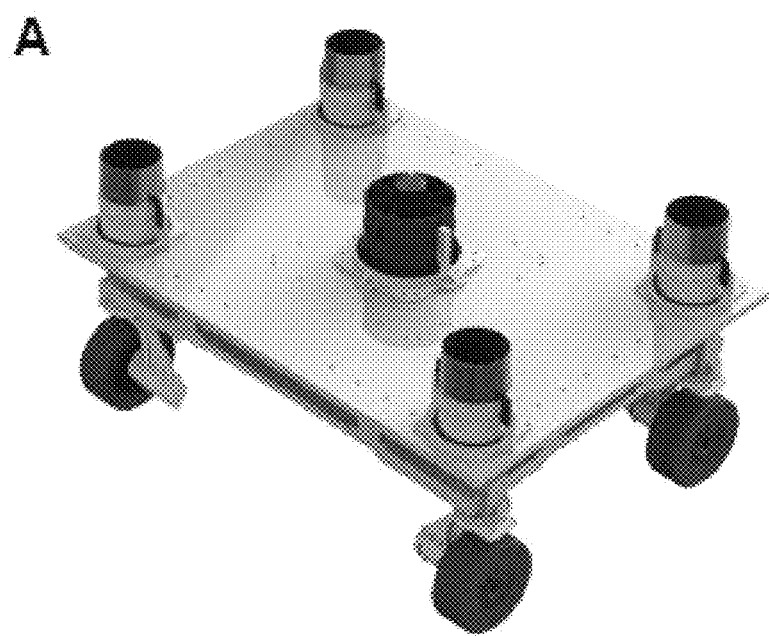
FIG. 22A is a perspective view of the chassis, wheels, and EDFs of a robotic device according to an embodiment of the subject invention.
Figure 22B:
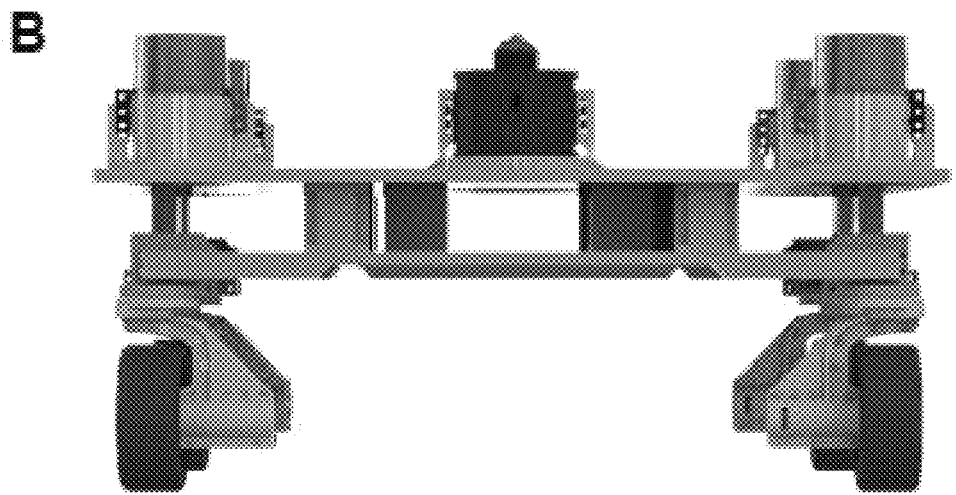
FIG. 22B is a side view of the robotic device of FIG. 22A.
Figure 22C:
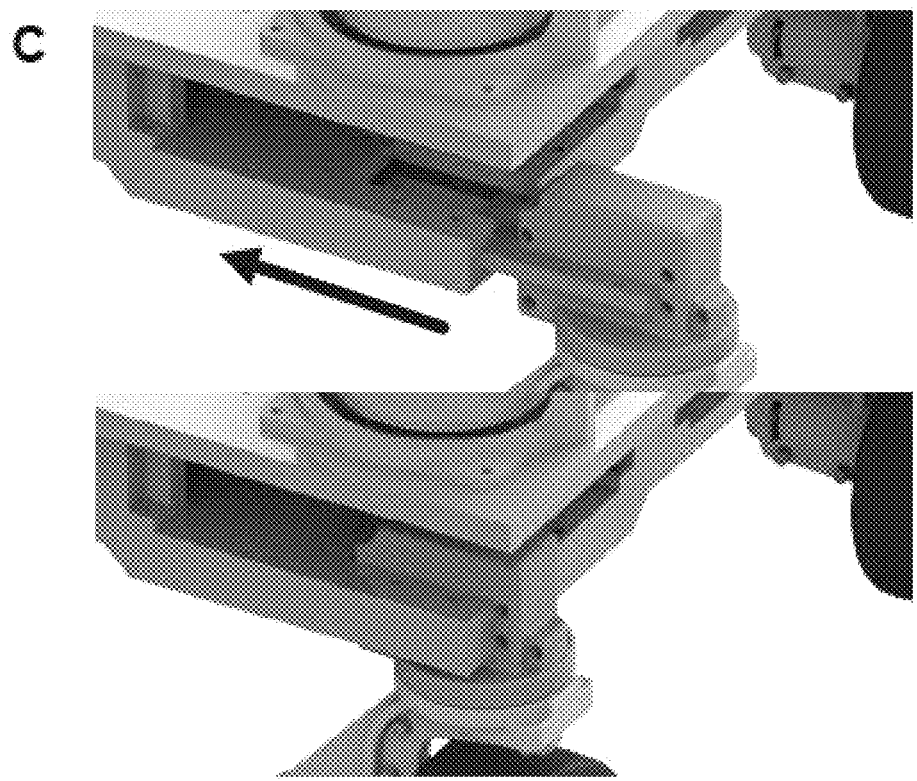
FIG. 22C is a close-up view showing how wheels can be inserted into the chassis in the device of FIG. 22A.
Figure 22D:
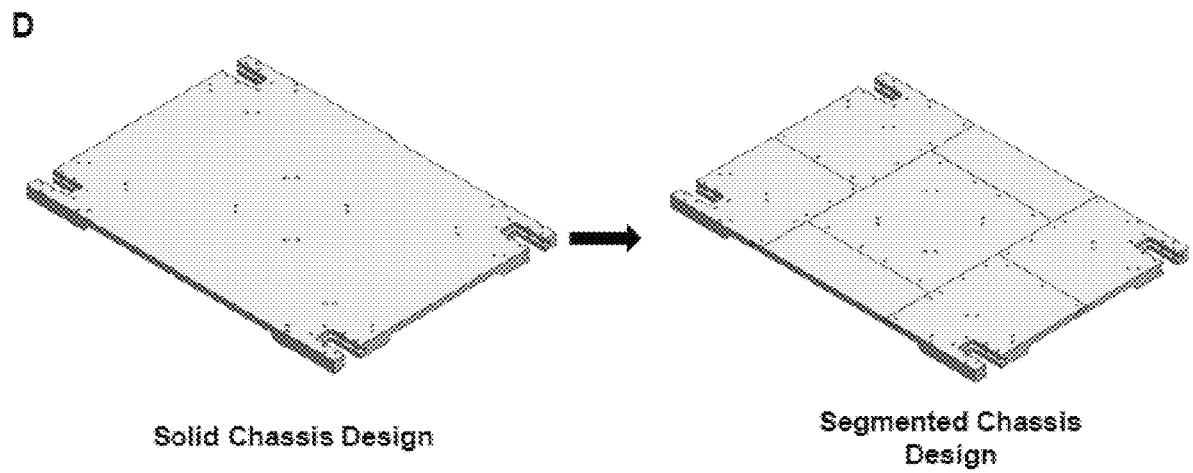
FIG. 22D is a perspective view of a solid chassis design and a segmented chassis design, both of which can be used with a robotic device according to an embodiment of the subject invention.

In some embodiments, the body chassis of the robotic device can be a single, monolithic structure (e.g., a "solid" chassis as depicted in FIG. 22D, left side). In some embodiments, the body chassis of the robotic device can be segmented (e.g., as depicted in FIG. 22D, right side). In either case, in certain embodiments, the wheels can be modular and connect into the chassis, for example as depicted in FIG. 22C.

In many embodiments, at least one of the wheels can have a drive mechanism, such as an omnidirectional drive mechanism 150. Referring to FIGS. 24A-24D, the drive mechanism can include, for example, a planetary gear drive setup 151 (for high torque output), an absolute encoder rod mount 152 (for robust control), and/or a design for large force distribution along a bottom motor enclosure unit 153. The planetary gear drive setup 151 and/or absolute encoder rod mount 152 can be included in a top module 155 disposed above the wheel 120. In some embodiments, all of the wheels of the robotic device can have a drive mechanism.

In many embodiments, the body chassis of the robotic device can include a hole for the EDF (or at least one respective hole for the plurality of EDFs, if multiple EDFs are included). The hole can receive the EDF (see, e.g., FIGS. 14A, 14B, and 22A).

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Figure 7:
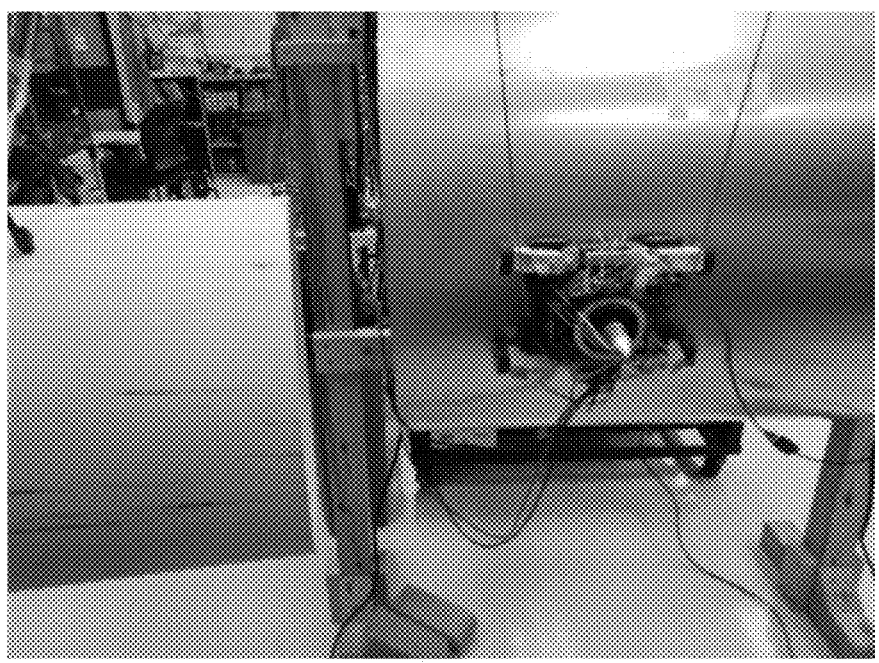
FIG. 7 is an image of the device of FIGS. 5 and 6 in use on the outside of a pipe.
Figure 8:
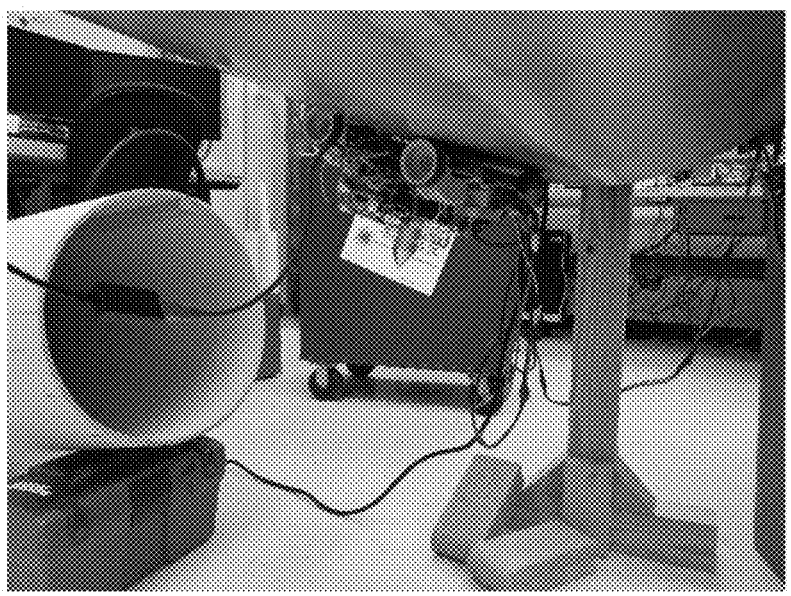
FIG. 8 is an image of the device of FIGS. 5 and 6 in use on the outside of a pipe.
Figure 9:
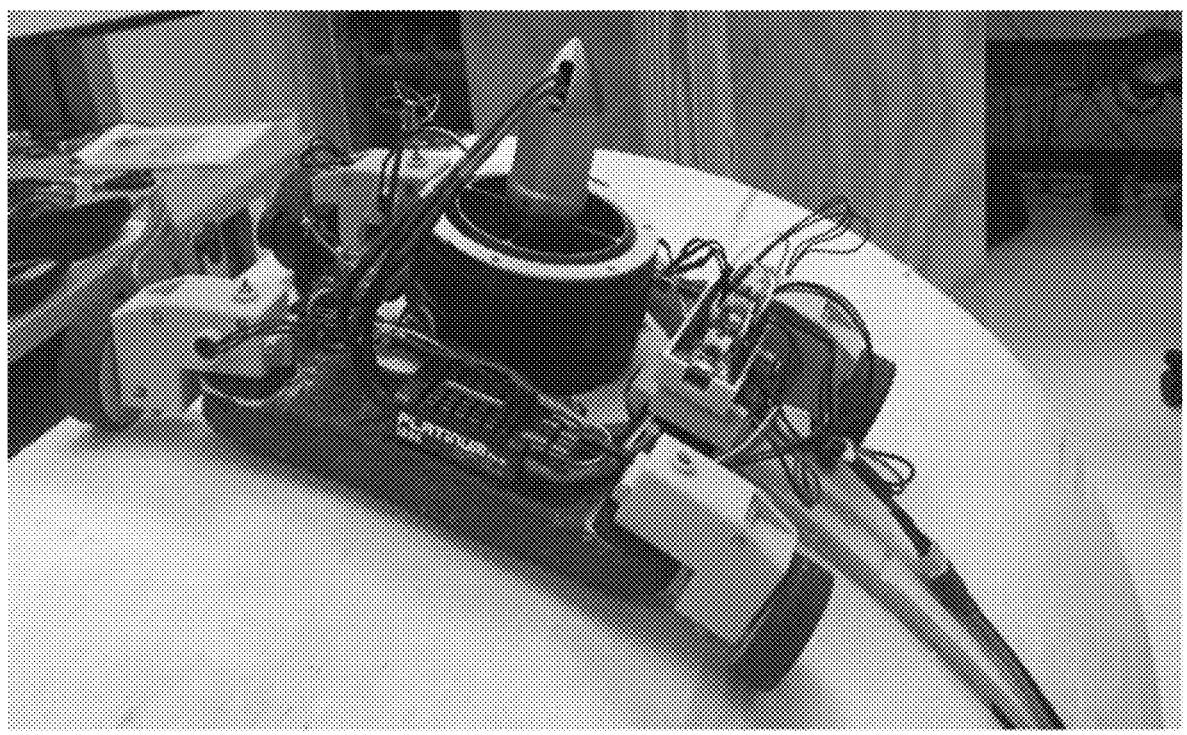
FIG. 9 is an image of the device of FIGS. 5 and 6 in use on the outside of a pipe.

A robotic device was constructed and tested. FIGS. 5, 6, and 10 show images of the constructed device. The device had a weight of 3.1 pounds (lbs), a width and length of 8 inches (in)×8 in, a tether length (length of tether attached to the device for safety and providing wired power) of 12.5 feet, and a force produced by the EDF of 6.2 lbs. Using the assembled system, the prototype was tested on a 3-foot diameter pipe with a wind of 30 mph. FIGS. 7-9 show images of the device during the test. The device was easily able to support its weight and circumnavigate around the pipe. Though the red safety tether can be seen in FIGS. 7-9, this was not needed and provided no support during the testing.

Example 2

Figure 13A:
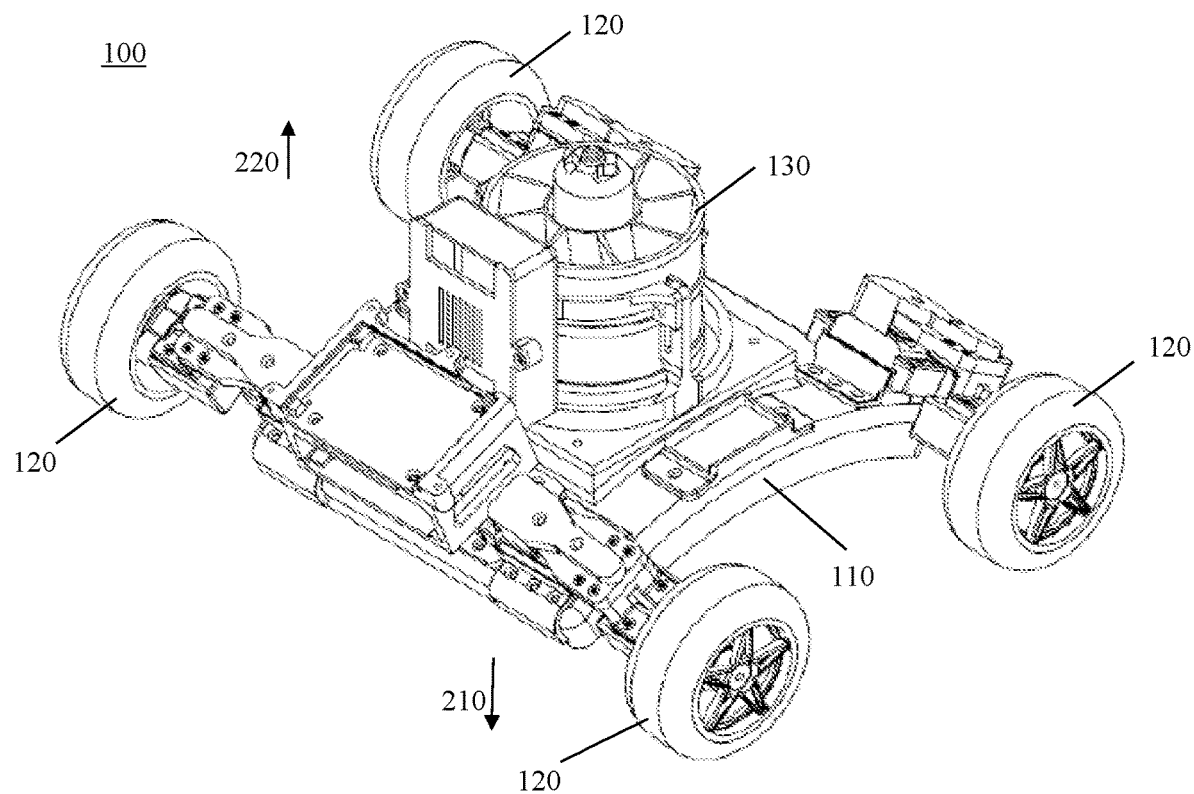
FIG. 13A is an image showing a robotic device according to an embodiment of the subject invention.
Figure 13B:
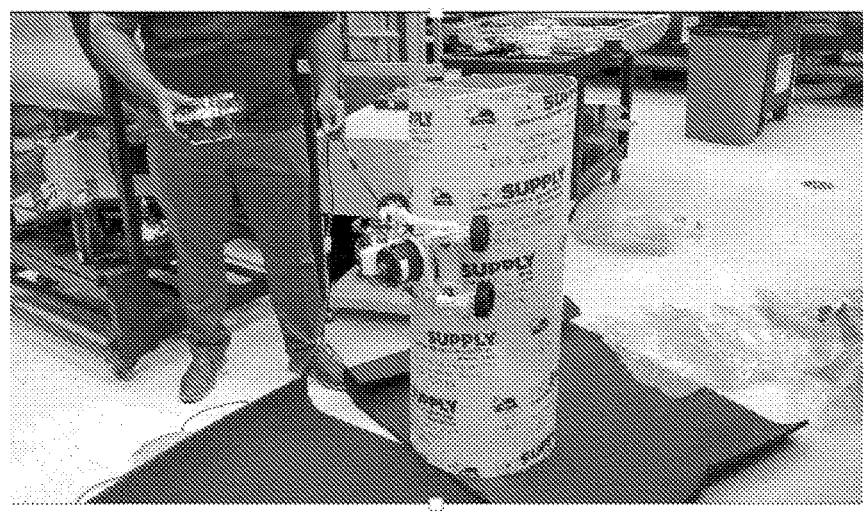
FIG. 13B is an image showing the robotic device of FIG. 13A in use on the outside of a pipe.

A robotic device was constructed, as shown in FIGS. 10 and 13A. Referring to FIG. 13A, the device had a curved chassis, an EDF, four 2-DOF wheel mounts for radial and lateral movement, an inertial measurement unit (IMU) for orientation determination, a radio receiver (and remote transmitter, for controlling fan speed, wheel orientation, and wheel speed), a Micro Maestro USB Servo controller (for wheel orientation), a TB6612FNG Dual Motor Driver Carrier (for wheel speed), a Teensy 3.2 microcontroller unit for communication to controllers, and step down voltage regulators (input of 22 V and output of 12 V and/or 6V). The mass was 3.3 lbs, the thrust was 7.7 lbs, the load capacity was about 4.4 lbs, the dimensions (length×width×height) were 16 in×15 in×7.5 in, and the power requirements were 22.2 Volts at max 100 Amps (or about 2000 Watts). This device was designed for a pipe with a diameter in a range of 13.5-16 inches (in). The device easily navigated on vertical pipe sections, horizontal pipe sections, reducers, and elbows. FIG. 13B shows the device in use on a pipe with a 16-in diameter.

Example 3

Figures 12A, 12B:
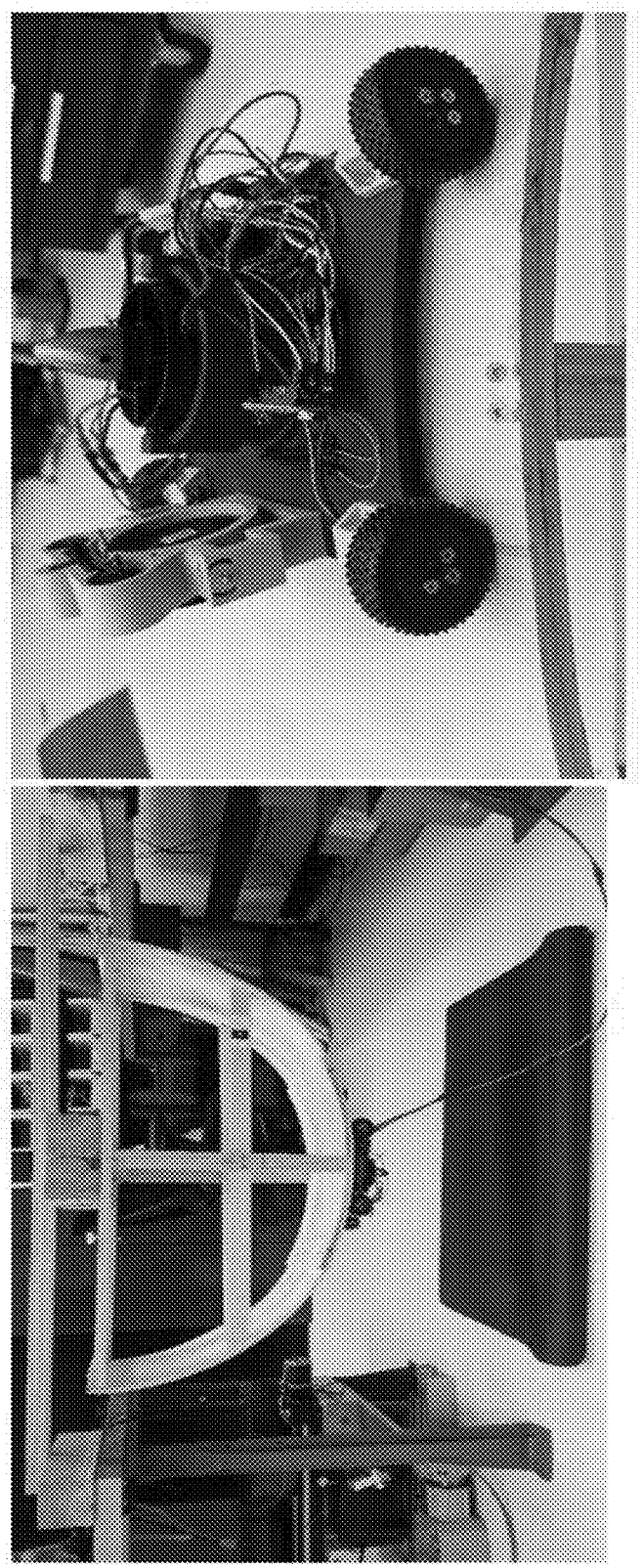
FIG. 12A is an image showing a robotic device according to an embodiment of the subject invention in use on the outside of a large-diameter pipe.
FIG. 12B is an image showing a robotic device according to an embodiment of the subject invention in use on the outside of a large-diameter pipe.

A robotic device was constructed, as shown in FIGS. 12A and 12B. Referring to FIGS. 12A and 12B, the device had a curved chassis, an EDF, four 2-DOF wheel mounts for radial and lateral movement, an inertial measurement unit (IMU) for orientation determination, a radio receiver (and remote transmitter, for controlling fan speed, wheel orientation, and wheel speed), and a controller (for wheel orientation). The device used a propeller setup and maintained contact with the surface using a mixture of suction pressure and propulsion. The weight was 1.54 lbs, with dimensions (length×width×height) of 8 in×8 in×4.4 in. The suction reached 5.21 lbs, leaving about 3.67 lbs for additional components.

The device was designed to fit on a pipe with a 36-inch diameter (i.e., the curved chassis was 3D-printed and curved such that the device would fit on such a pipe). The device was able to navigate upside down (see, e.g., FIG. 12A). The device was fitted with both an internet protocol (IP) camera (capable of streaming live video feeds) and a lighting source (LED lights each rated at 30 lumens). The system operated at about 225 Watts (W).

Example 4

Figure 14A:
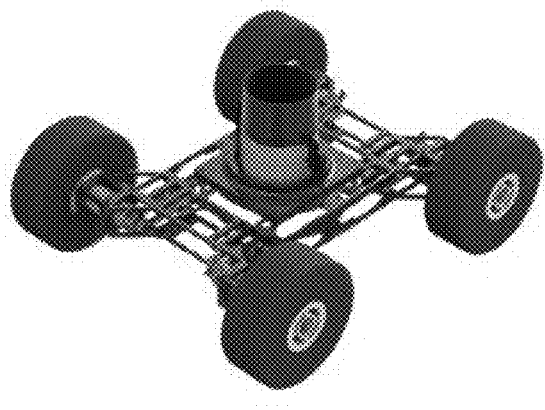
FIG. 14A is a perspective view of a robotic device according to an embodiment of the subject invention.
Figure 14B:
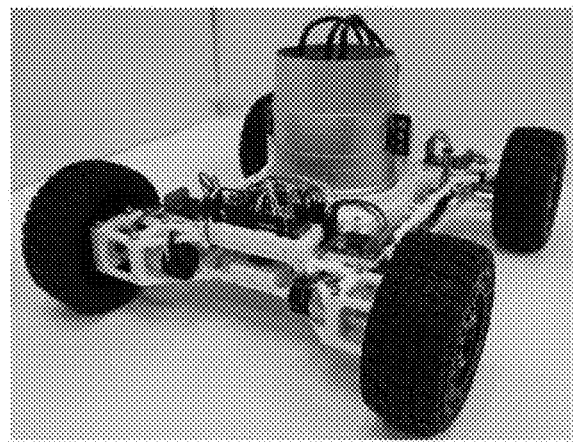
FIG. 14B is an image showing a perspective view of a robotic device according to an embodiment of the subject invention.
Figure 15:
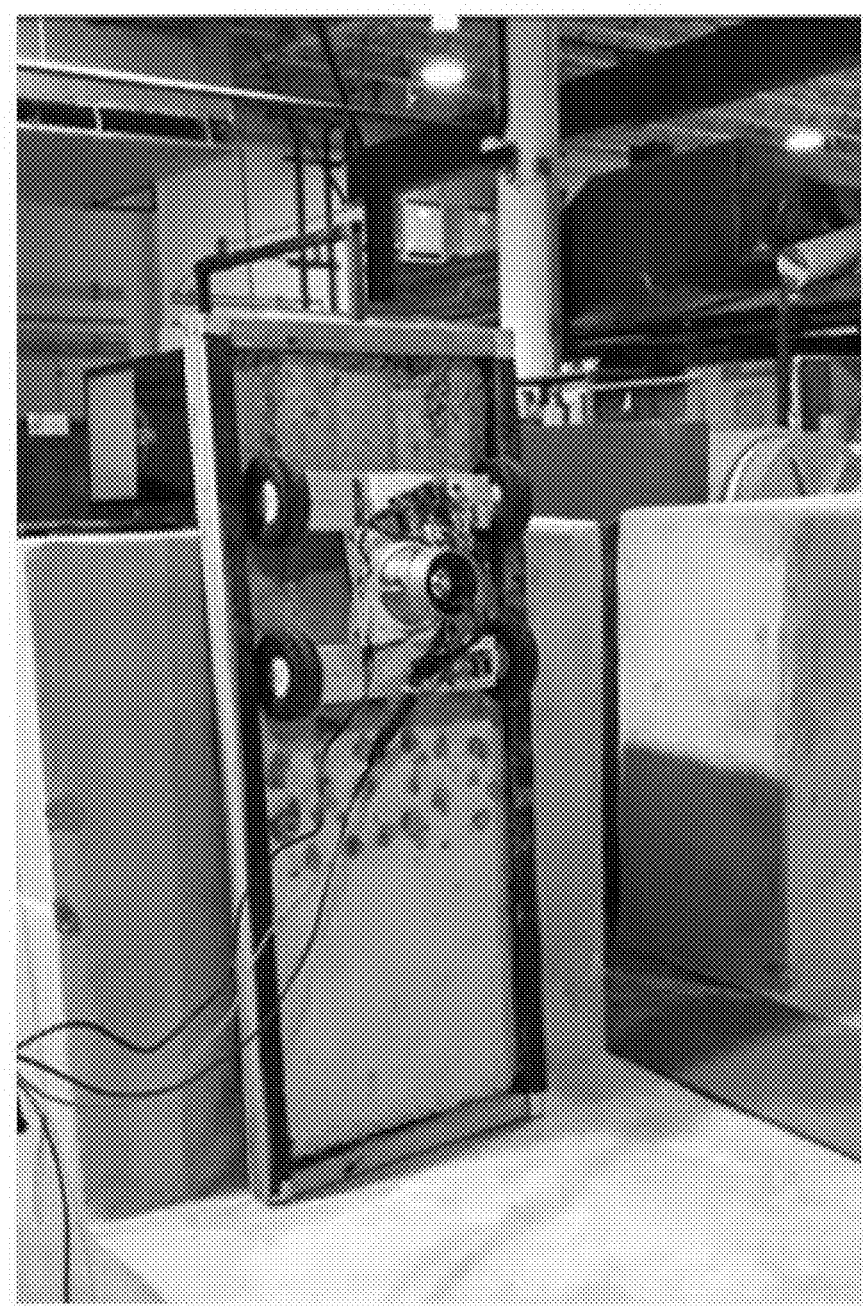
FIG. 15 is an image showing the robotic device of FIG. 14B in use on a rugged wall.
Figure 16:
FIG. 16 is an image showing the robotic device of FIGS. 14B and 15 in use, transitioning from a wall to a horizontal surface (where the device would be upside down).

A robotic device was constructed, as shown in FIG. 14B. The device was designed as a wall crawler, with a large EDF in the center and four wheels. The EDF was a Dr. Mad Thrust 90 mm EDF unit, as shown in FIGS. 28A and 28B. The device chassis was not designed with a curvature intended to match a pipe. The device was able to easily navigate on a concrete wall with defects (corrosion and/or erosion), as well as transition between a wall and ceiling, as seen in FIGS. 15-17.

Example 5

Figure 19:
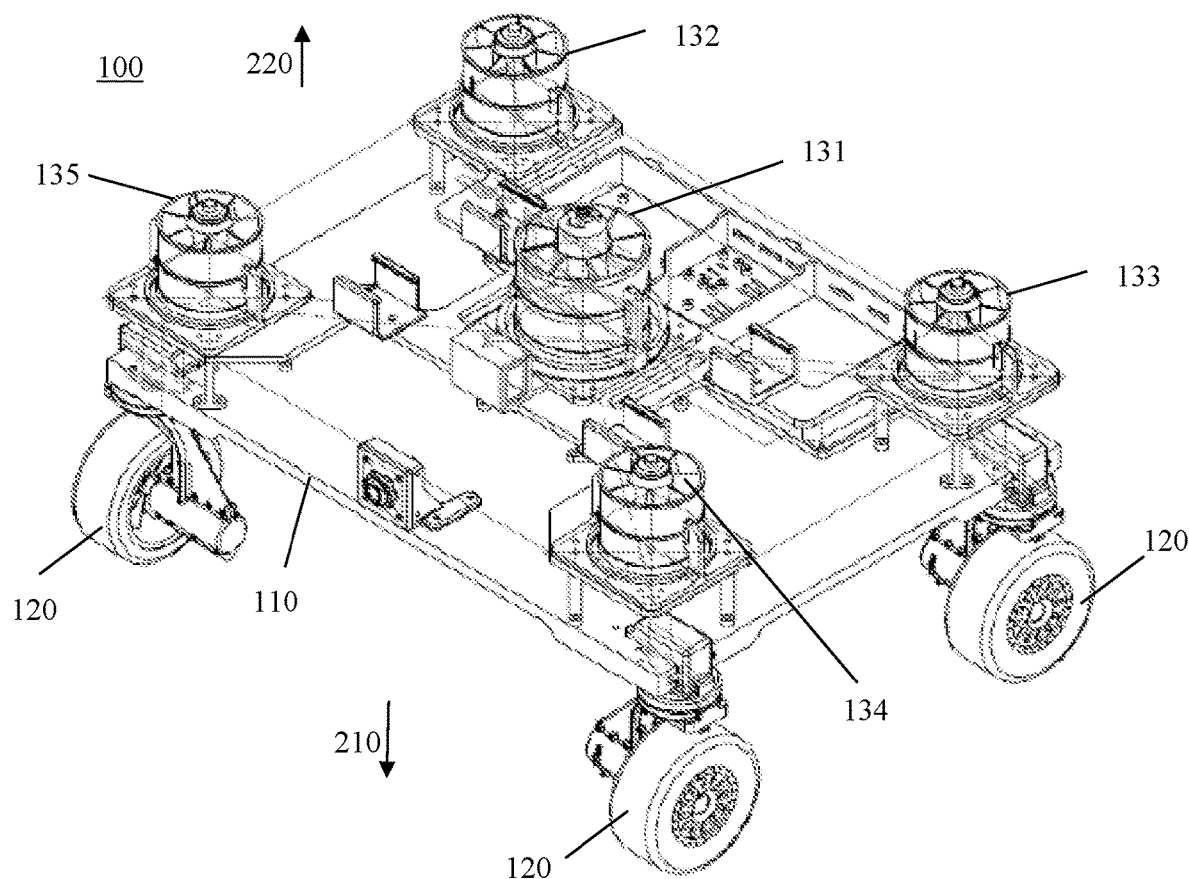
FIG. 19 is a perspective view of a robotic device according to an embodiment of the subject invention.
Figure 20:
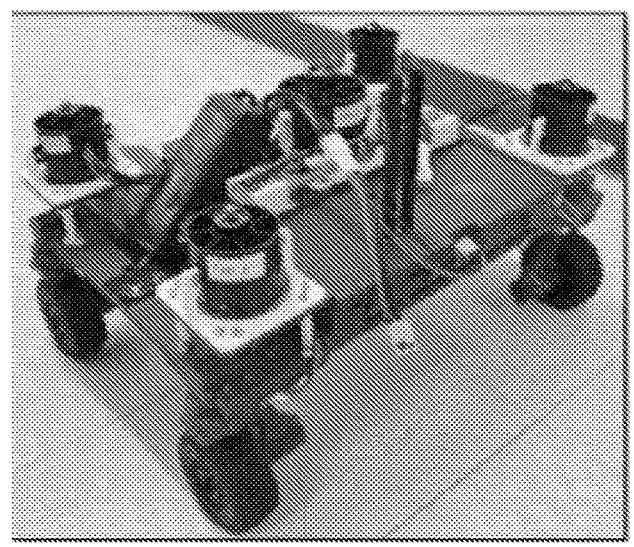
FIG. 20 is an image of a perspective view of the other side of the robotic device of FIG. 19.
Figure 21:
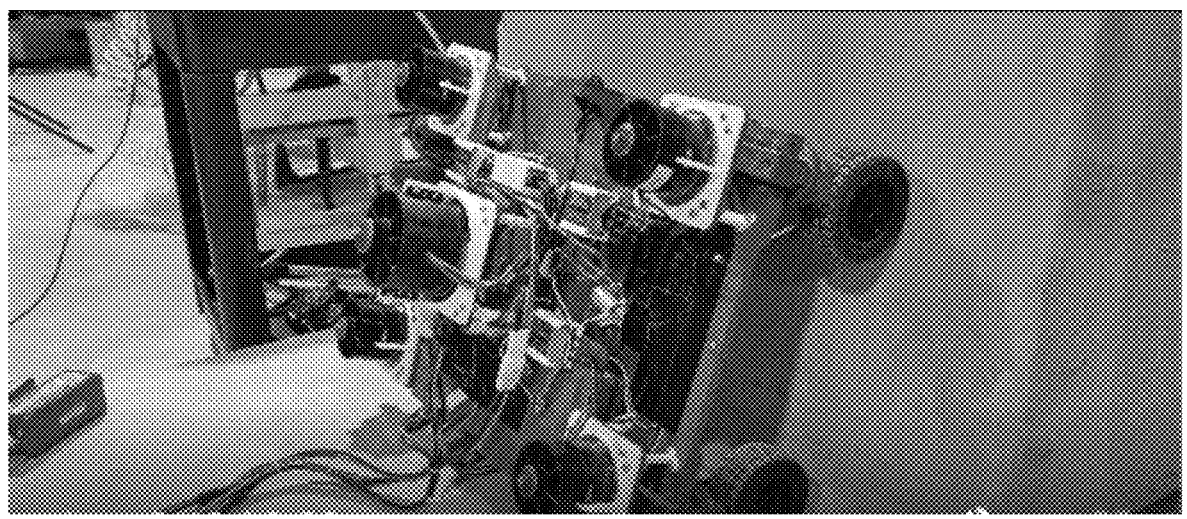
FIG. 21 is an image of the robotic device of FIGS. 19 and 20 in use on a wall.

A robotic device was constructed, as shown in FIGS. 19 and 20 (similar to that shown in FIGS. 22A and 22B). The device was designed as a wall crawler, with four wheels and five EDFs—one in the center and one at each corner corresponding to where the wheels are. The device chassis was not designed with a curvature intended to match a pipe. The device was able to easily navigate on a concrete wall with defects (corrosion and/or erosion), as well as transition between a floor and a wall (as seen in FIG. 21) and between the wall and a ceiling.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A robotic inspection device, comprising:
a body chassis;
a plurality of wheels attached to the body chassis and disposed lower than a lower surface of the body chassis, in a first direction perpendicular to the lower surface of the body chassis; and
at least one electronic ducted fan (EDF) disposed on the body chassis and configured to blow air in a second direction opposite to the first direction, thereby providing thrust in the first direction to the robotic inspection device,
the body chassis being curved such that the robotic inspection device is configured to navigate on an external surface of a pipe, and
each wheel of the plurality of wheels being a two-degree-of-freedom (2-DOF) wheel.

2. The robotic inspection device according to claim 1, the body chassis being curved such that the robotic inspection device is configured to navigate on an external surface of a pipe having a diameter in a range of from 13 inches to 16 inches.

3. The robotic inspection device according to claim 1, the body chassis being curved such that the robotic inspection device is configured to navigate on an external surface of a pipe having a diameter of at least 32 inches.

4. The robotic inspection device according to claim 1, the at least one EDF comprising a first EDF disposed in a center area of the body chassis.

5. The robotic inspection device according to claim 4, at least one EDF further comprising a second EDF, a third EDF, a fourth EDF, and a fifth EDF respectively disposed at four corner areas of the body chassis.

6. The robotic inspection device according to claim 1, the body chassis being a single, monolithic structure.

7. The robotic inspection device according to claim 1, further comprising at least one nondestructive examination (NDE) sensor disposed on the body chassis.

8. The robotic inspection device according to claim 1, further comprising an omnidirectional drive mechanism disposed on each wheel of the plurality of wheels.

9. The robotic inspection device according to claim 1, further comprising a radio receiver and transmitter configured to remotely communicate with a controller for controlling at least one of a speed of the at least one EDF, an orientation of the plurality of wheels, and a speed of the plurality of wheels.

10. A robotic inspection device, comprising:
a body chassis;
a plurality of wheels attached to the body chassis and disposed lower than a lower surface of the body chassis, in a first direction perpendicular to the lower surface of the body chassis;
at least one electronic ducted fan (EDF) disposed on the body chassis and configured to blow air in a second direction opposite to the first direction, thereby providing thrust in the first direction to the robotic inspection device, and
an omnidirectional drive mechanism disposed on each wheel of the plurality of wheels,
the omnidirectional drive mechanism comprising a planetary gear drive setup, an absolute encoder rod mount, and a design for large force distribution along a bottom motor enclosure unit.

11. A method of inspecting a pipe or wall, the method comprising:
providing a robotic inspection device on the pipe or wall, the robotic inspection device comprising:
a body chassis;
a plurality of wheels attached to the body chassis and disposed lower than a lower surface of the body chassis, in a first direction perpendicular to the lower surface of the body chassis;
at least one electronic ducted fan (EDF) disposed on the body chassis and configured to blow air in a second direction opposite to the first direction, thereby providing thrust in the first direction to the robotic inspection device; and
a receiver for receiving control signals from a controller; and
controlling, using the controller, at least one of a speed of the at least one EDF, an orientation of the plurality of wheels, and a speed of the plurality of wheels such that the robotic inspection device navigates on the pipe or wall,
the body chassis being curved such that the robotic inspection device is configured to navigate on an external surface of the pipe, and
each wheel of the plurality of wheels being a two-degree-of-freedom (2-DOF) wheel.

12. The method according to claim 11, the at least one EDF comprising:
a first EDF disposed in a center area of the body chassis; and
a second EDF, a third EDF, a fourth EDF, and a fifth EDF respectively disposed at four corner areas of the body chassis.

13. The method according to claim 11, the robotic inspection device further comprising at least one nondestructive examination (NDE) sensor disposed on the body chassis, and
the method further comprising receiving data from the at least one NDE sensor.

14. The method according to claim 11, the receiver being a radio receiver that remotely receives control signals from the controller, and
the robotic inspection device further comprising a radio transmitter configured to remotely transmit signals to the controller.

15. A method of inspecting a pipe or wall, the method comprising:
providing a robotic inspection device on the pipe or wall, the robotic inspection device comprising:
a body chassis;
a plurality of wheels attached to the body chassis and disposed lower than a lower surface of the body chassis, in a first direction perpendicular to the lower surface of the body chassis;
at least one electronic ducted fan (EDF) disposed on the body chassis and configured to blow air in a second direction opposite to the first direction, thereby providing thrust in the first direction to the robotic inspection device; and
a receiver for receiving control signals from a controller, and
controlling, using the controller, at least one of a speed of the at least one EDF, an orientation of the plurality of wheels, and a speed of the plurality of wheels such that the robotic inspection device navigates on the pipe or wall,
the robotic inspection device further comprising an omnidirectional drive mechanism disposed on each wheel of the plurality of wheels, and
the omnidirectional drive mechanism comprising a planetary gear drive setup, an absolute encoder rod mount, and a design for large force distribution along a bottom motor enclosure unit.

16. A robotic inspection device, comprising:
a body chassis;
a plurality of wheels attached to the body chassis and disposed lower than a lower surface of the body chassis, in a first direction perpendicular to the lower surface of the body chassis, the plurality of wheels comprising four wheels respectively disposed at corner areas of the body chassis;
at least one electronic ducted fan (EDF) disposed on the body chassis and configured to blow air in a second direction opposite to the first direction, thereby providing thrust in the first direction to the robotic inspection device;
at least one nondestructive examination (NDE) sensor disposed on the body chassis;
an omnidirectional drive mechanism disposed on each wheel of the plurality of wheels; and
a radio receiver and transmitter configured to remotely communicate with a controller for controlling at least one of a speed of the at least one EDF, an orientation of the plurality of wheels, and a speed of the plurality of wheels,
the body chassis being curved such that the robotic inspection device is configured to navigate on an external surface of a pipe having a diameter of at least 13 inches,
each wheel of the plurality of wheels being a two-degree-of-freedom (2-DOF) wheel,
the at least one EDF comprising a first EDF disposed in a center area of the body chassis, and
the omnidirectional drive mechanism comprising a planetary gear drive setup, an absolute encoder rod mount, and a design for large force distribution along a bottom motor enclosure unit.

17. The robotic inspection device according to claim 16, the at least one EDF further comprising a second EDF, a third EDF, a fourth EDF, and a fifth EDF respectively disposed at the four corner areas of the body chassis.

* * * * *